United States Patent [19]

Boland et al.

[11] Patent Number: 4,635,983

[45] Date of Patent: Jan. 13, 1987

[54] REAR BUMPER ASSEMBLY FOR CABLE PULLING TRUCK

[75] Inventors: Donald P. Boland, Downers Grove; William Menz, Villa Olivia; Glen R. Seimetz, Hanover Park, all of Ill.

[73] Assignee: Illinois Bell Telephone Company, Chicago, Ill.

[21] Appl. No.: 827,768

[22] Filed: Feb. 7, 1986

[51] Int. Cl.⁴ ............................................. B60R 19/02
[52] U.S. Cl. ................... 293/111.1; 293/114; 293/117; 280/765.1; 254/323
[58] Field of Search ............. 293/117, 111.1, 114; 280/765.1, 766.1; 254/323

[56] References Cited

U.S. PATENT DOCUMENTS

| | | | |
|---|---|---|---|
| 2,608,431 | 8/1952 | Iuarnstrom | 293/111.1 |
| 3,825,095 | 7/1974 | Clark | 280/766.1 |
| 3,829,064 | 8/1974 | Jackson | 254/323 |
| 4,127,295 | 11/1978 | Robinson | 293/117 |
| 4,419,038 | 12/1983 | Pendergraft | 293/117 |

OTHER PUBLICATIONS

Pp. 1,2 and 5 of Arnco Equipment Catalog, 1984.

*Primary Examiner*—Robert R. Song
*Attorney, Agent, or Firm*—Emrich & Dithmar

[57] ABSTRACT

A cable pulling truck has a rear bumper assembly secured to the vehicle frame. The bumper assembly includes two laterally outwardly extensible telescoping outrigger supports, each carrying at its outer end an upstanding vertical support tube for receiving therein the shaft of an associated winch motor in its use configuration. Each outrigger also carries a hand-operated jack assembly for supporting the vehicle on the ground, each jack assembly being pivotally movable between storage and use conditions. Multiple hydraulic and electrical couplers are carried by the bumper assembly for connecting the cable pulling system to hydraulic and electrical systems on board the truck.

20 Claims, 6 Drawing Figures

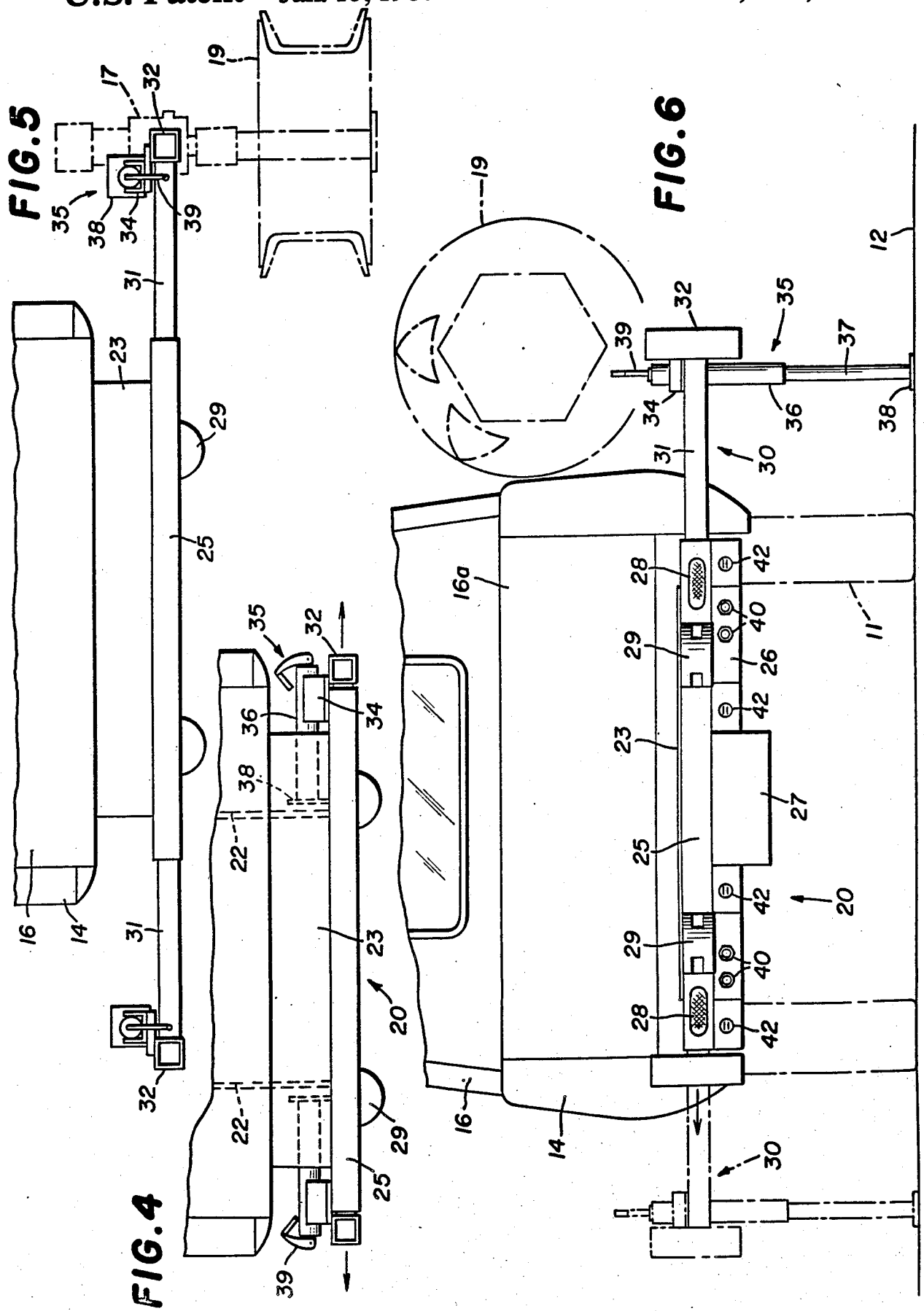

REAR BUMPER ASSEMBLY FOR CABLE PULLING TRUCK

BACKGROUND OF THE INVENTION

The present invention relates to apparatus for pulling cables, such as fiber optic cables, through underground conduit or ductwork. In particular, the invention relates to improvements in a vehicle utilized for such cable pulling operations.

Many utility cables are today disposed in underground ducts. Special systems are utilized for placing cables in the ducts. In recent years, many of the new communication cables are fiber optic cables. Special problems are created in handling fiber optic cable and, therefore, special cable placing systems have been devised for use by utilities companies, such as telephone companies, for placing fiber optic cable in underground ducts.

For this purpose, the utility companies may utilize specially designed trucks which carry the cable placing system to the field location. Typically, access to the underground ductwork is provided by manholes disposed at spaced-apart locations along the duct path. The cable pulling system includes a specially designed winch assembly which takes up a pulling tape which is connected to the leading end of a cable section for pulling it through a length of duct between fiber optic splice locations. The electrical and/or hydraulic power for operating the cable placing system may be carried on board the truck but, at present, there is no convenient way for effecting connections between the winch assembly and the hydraulic and electrical systems.

Furthermore, in prior cable pulling systems, the winch motor and take-up reel are mounted within the truck and, for use, the winch assembly is typically set up for use in the bed of the truck. This limits the accessability of the winch unit to the operator and also limits the access to the manhole. Thus, in order to ensure pulling in the proper direction, it may be necessary to orient the truck in a particular configuration, which may be difficult depending upon the terrain or obstructions in the vicinity of the manhole. Alternatively, the winch assembly must be set up for use on the ground on special support mechanism independent of the truck. This complicates the setup procedure and, depending upon the terrain, may make it very difficult to obtain a stable mount for the winch assembly.

SUMMARY OF THE INVENTION

It is a general object of the invention to provide support and coupling apparatus for a cable pulling winch assembly which avoids the disadvantages of prior systems while affording additional structural and operating advantages.

An important feature of the invention is the provision of apparatus which consolidates support and coupling structure for the winch assembly in a single frame which may be mounted on a wheeled vehicle.

In connection with the foregoing feature, it is another feature of the invention to provide the special frame in the form of a bumper assembly for a wheeled vehicle.

Yet another feature of the invention is the provision of a bumper assembly of the type set forth which permits mounting of the winch assembly in a number of different positions outboard of the vehicle chassis.

Yet another feature of the invention is the provision of a bumper assembly of the type set forth, which permits a stable support for the winch assembly independently of the vehicle suspension system.

It is still another feature of the invention to provide a bumper assembly of the type set forth which provides both electrical and hydraulic coupling points for the winch assembly, which coupling points are directly connected to hydraulic and electrical systems on-board the vehicle.

These and other features of the invention are attained by providing a bumper apparatus for a wheeled vehicle carrying a cable pulling system including a winch assembly, the bumper apparatus comprising: a frame fixedly secured to the vehicle, extensible support means carried by the frame and movable with respect thereto between a retracted stowed position and an extended use position projecting away from the vehicle, and mounting means carried by the support means and adapted for supporting engagement with the associated winch assembly in a use configuration.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 4 is a fragmentary top plan view of the bumper assembly of FIG. 2, illustrating the parts thereof in their stowed conditions;

FIG. 5 is a view similar to FIG. 4, illustrating the support assemblies in their extended conditions and the jack assemblies in their supporting conditions, and illustrating mounting of the winch assembly; and FIG. 6 is a fragmentary rear elevational view of the bumper assembly of FIG. 5.

DESCRIPTION OF THE PREFERRED EMBODIMENT

Figure 1:
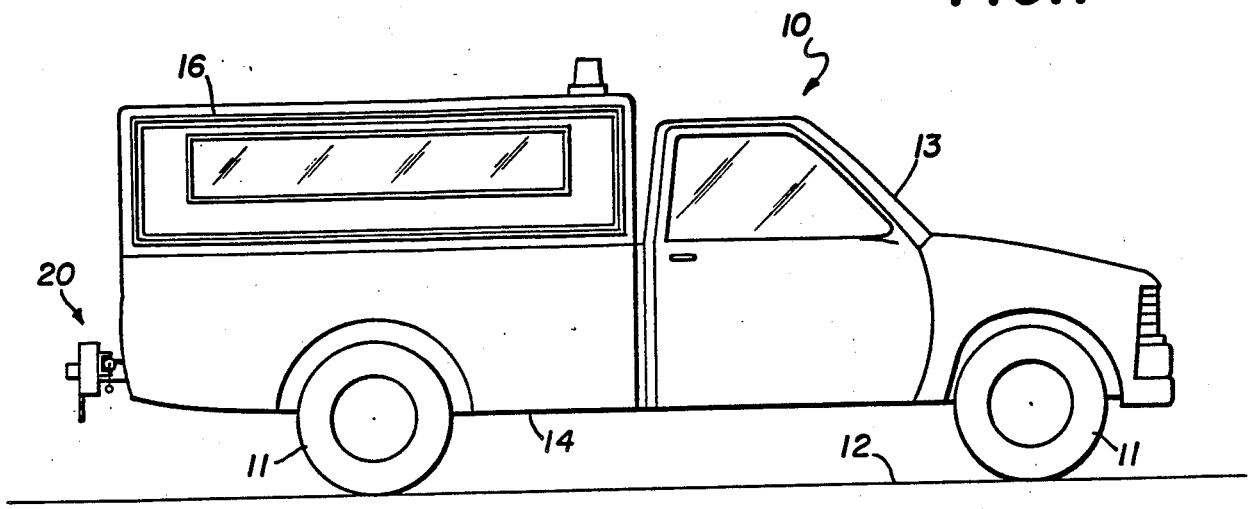
FIG. 1 is a side elevational view of a vehicle used for cable pulling operations and incorporating a bumper assembly constructed in accordance with and embodying the features of the present invention.
Figure 2:
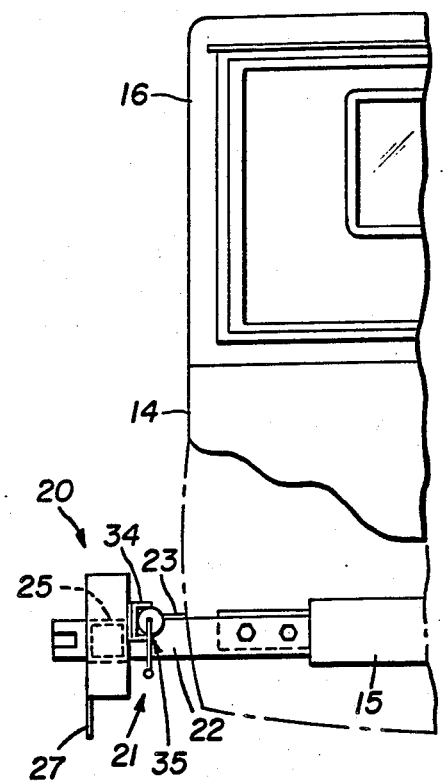
FIG. 2 is an enlarged fragmentary side elevational view of the rear portion of the vehicle of FIG. 1, partly broken away more clearly to illustrate the mounting of the bumper assembly.

Referring to FIGS. 1 and 2, there is illustrated a truck 10 of the type which can be used for cable placing operations and particularly cable pulling operations. The truck 10 is designed to have particular application to the pulling of fiber optic cable, sometimes referred to as lightguide. The truck 10 has wheels 11 adapted for rolling engagement with a roadway or other associated support surface 12. The truck 10 may be of several types, but is preferably of the "pick-up" type, having a cab 13 and a cargo bed 14 mounted on a chassis frame 15 (see FIG. 2). The cargo bed 14 may be provided with a top or cover 16 which may be provided with suitable windows and/or doors. Preferably, the cargo bed 14 also has a standard tailgate 16a (see FIG. 6).

Figure 3:
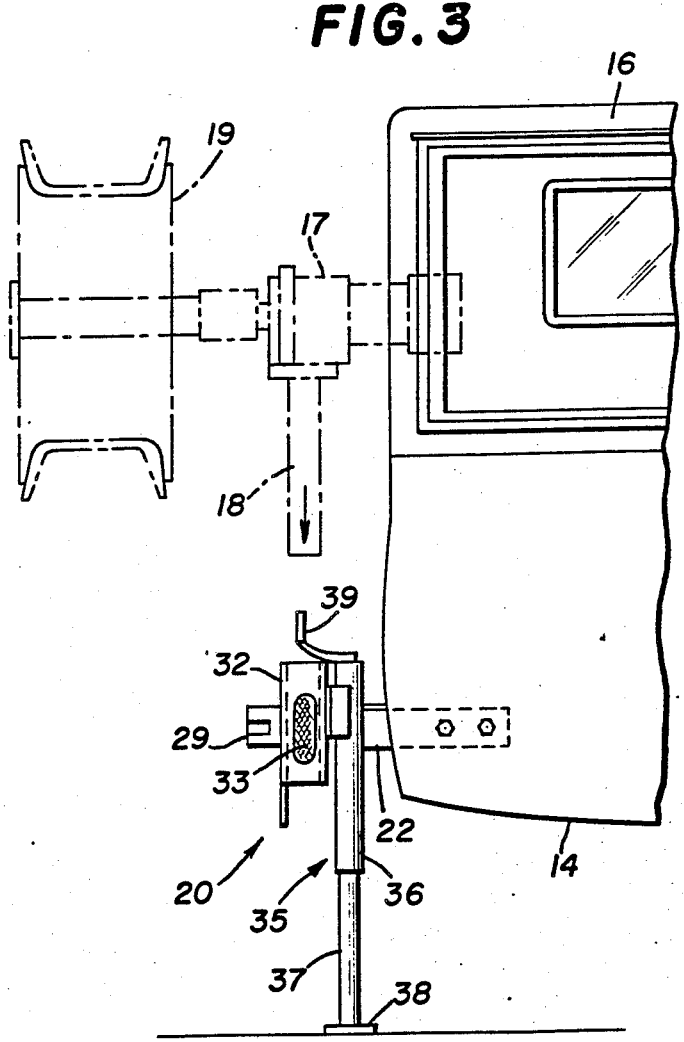
FIG. 3 is a view similar to FIG. 2, illustrating one of the jack assemblies of the bumper assembly in its supporting configuration, and illustrating the manner of mounting of the winch assembly on the bumper assembly.

Referring also to FIG. 3, the truck 10 is adapted to store in the cargo bed 14 various items of equipment utilized in the cable pulling operation, including a winch motor 17, which may be hydraulically operated and is provided with a support post 18, and a take-up reel 19 adapted to be mounted on the shaft of the winch motor 17 for rotation thereby, all in a known manner.

Referring now to FIGS. 2–6, the truck 10 has a rear bumper assembly 20, constructed in accordance with and embodying the features of the present invention. The bumper assembly 20 includes a frame 21 (FIG. 2) which is fixedly secured to the chassis frame 15 of the truck 10. More particularly, the frame 21 has a pair of vertical rectangular mounting plates 22 which respectively slide over the outer sides of the rear ends of the side rails of the chassis frame 15 and are bolted thereto. A rectangular horizontal top plate 23 overlies the mounting plates 22 and is fixedly secured thereto. Connected to the rear ends of the mounting plates 22 and secured immediately beneath the top plate 23 is a horizontally extending main tube 25 which is substantially square in transverse cross section and extends substantially the width of the tailgate 16a immediately therebeneath, perpendicular to the longitudinal axis of the truck 10. Depending substantially vertically from the main tube 25 is a rectangular plate 26 which carries, intermediate its ends, a license plate bracket 27 (see FIG. 6). Mounted on the rear wall of the main tube 25, respectively adjacent the opposite ends thereof, are two taillights 28 (FIG. 6) which are connected to the electrical system (not shown) of the truck 10, in standard fashion. The main tube 25 also carries a pair of rearwardly projecting bumper pads 29.

The bumper assembly 20 carries a pair of outrigger assemblies 30, respectively mounted at opposite ends of the main tube 25, and constructed substantially as mirror images of each other, so that only one will be described in detail. Each outrigger assembly 30 includes an inner telescoping tube 31, substantially square in transverse cross section (FIGS. 4–6), and adapted to be slidably telescoped within the adjacent open end of the main tube 25. Fixedly secured to the outer end of the inner tube 31 is a vertically extending hollow support tube 32, which is also substantially square in transverse cross section. The support tube 32 may be provided with a suitable reflector 33 (see FIG. 3) on its outer side surface.

In use, the inner tube 31 is adapted for sliding movement between a retracted stowed position, illustrated in FIG. 4, and a fully extended use position, illustrated in FIGS. 5 and 6. In the stowed position, the inner tube 31 is completely withdrawn within the main tube 25 with the vertical support tube 32 abutting the adjacent end of the main tube 25. In the extended use position, the inner tube 31 projects from the main tube 25 laterally outwardly of the truck 10, with the vertical support tube 32 positioned well outboard of the cargo bed 14. If desired, suitable stops (not shown) may be provided on the outrigger assembly 30 to limit the outward movement of the inner tube 31.

Respectively pivotally mounted on the inner tubes 31, as by pivot mounts 34, are two jack assemblies 35, which are constructed substantially as mirror images of each other, so that only one will be described in detail. Each of the jack assemblies 35 is in the form of a screw-type jack, which includes a main tube 36 fixedly secured, as by welding, to the pivot mount 34, and having telescopically received therein an inner extension tube 37 which is adapted to extend downwardly therefrom. Fixedly secured to the lower end of the extension tube 37 is a square foot pad 38. The extension tube 37 is movable in use between a fully-retracted position completely withdrawn within the main tube 36 with the foot pad 38 bearing against the lower end of the main tube 36 (FIG. 4), and an extended use position, illustrated in FIGS. 3 and 6.

Movement of the extension tube 37 between its retracted and extended positions is accomplished by a screw-type mechanism mounted within the main tube 36 and actuated by a crank handle 39 in standard fashion. The pivot mount 34 accommodates a pivotal movement of the jack assembly 35 between a horizontal storage condition disposed along the inside of the main tube 25 substantially parallel thereto, as illustrated in FIGS. 2 and 4, and a vertical use condition, illustrated in FIGS. 3, 5 and 6. A suitable latch (not shown) may be provided for holding the jack assembly 35 in its storage condition. In use, the jack assembly 35 is cranked down until the foot pad 38 engages the ground or roadway 12, and then is cranked further to jack up the truck chassis frame 15 to provide support thereof independently of the truck suspension system. This provides a stable firm support for the cargo bed 14, and insulates it from any incidental forces which may be exerted thereon, as by wind, operation of the truck engine, and the like.

Also carried by the bumper assembly 20 and particularly by the plate 26 thereof, are two pairs of quick-connect/disconnect hydraulic couplers 40 and four electrical outlet sockets 42 (see FIG. 6). Preferably the two pairs of hydraulic couplers 40 are respectively disposed adjacent to opposite ends of the bumper assembly 20, and the electrical outlet sockets 42 are spaced apart along the bumper assembly 20. If desired, the electrical outlet sockets 42 may be provided with suitable covers (not shown) to protect them from water and roadway dirt and grime when not in use. The electrical system is preferbly a 12 VDC system powered by the truck battery.

The operation of the bumper assembly 20 will now be explained in detail. When the truck 10 has been disposed in position for performing a cable pulling operation, the outrigger assemblies 30 are moved to their extended use positions, illustrated in FIGS. 3, 5 and 6. The winch motor 17 is mounted on one of the supports posts 18, depending upon which side of the truck 10 would provide the most advantageous mounting for the cable pulling and winch assembly. This will be determined by the location of the manhole through which the fiber optic cable is to be pulled with respect to the truck 10. More particularly, the winch motor post 18 is telescopically fitted down into the vertical support tube 32, as indicated by the arrow in FIG. 3. In this regard, it will be appreciated that the support post 18 is also of square transverse cross section, and the motor 17 will be mounted in whichever orientation is most advantageous for the desired access to the associated manhole.

The take-up reel 19 is then removed from the truck bed 14 and mounted on the shaft of the winch motor 17, as illustrated in FIGS. 3, 5, and 6. After the outrigger assemblies 30 are extended, the associated jack assemblies 35 are pivoted downwardly to their use positions and cranked into engagement with the roadway or ground 12 to provide a stable support for the cargo bed 14, and to provide additional support for the winch motor 17 and take-up reel 19. If desired, only the outrigger assembly 30 supporting the winch motor 17 could be extended and its jack assembly 35 operated.

Once the winch motor 17 has been set up as described above, it is then coupled to a suitable power source on-board the truck 10. Preferably, the winch motor 17 is hydraulically operated and the truck 10 will be provided with an on-board hydraulic system (not shown), to which the hydraulic couplers 40 are connected. The winch motor 17 is connected to this hydraulic system by suitable connecting conduits (not shown) which are carried in the truck 10. These conduits will be provided with couplers at one end adapted to be connected to the motor 17 and couplers at their other end adapted to be coupled to the adjacent pair of couplers 40 on the bumper assembly 20.

Similarly, the cable pulling system may include certain electrically-operated equipment, such as a tension controller (not shown). Such equipment may be connected to the on-board electrical system of the truck 10 by plugging into a selected one of the electrical outlet sockets 42. More specifically, when a tension controller is utilized, it will be provided with an electrical conductor adapted to be plugged into a suitable one of the sockets 42, and another set of electrical leads adapted to be connected to the winch motor 17, all in standard fashion. It will, of course, be appreciated that other types of electrically or hydraulically operated equipment such as lights, blowers, sump pumps and the like may also be connected to the on-board electrical and hydraulic systems of the truck 10 via the hydraulic couplers 40 or the electrical outlet sockets 42. Thus, all electrical and hydraulic connections can be made easily at a single accessible location at the rear end of the truck 10.

From the foregoing, it can be seen that there has been provided an improved bumper assembly for a cable pulling truck, which bumper assembly includes telescoping outriggers for supporting associated equipment such as a winch assembly or the like, the outriggers being provided with jack assemblies to afford additional support for the winch assembly and/or to provide support of the truck chassis independently of its suspension system. There is also provided a bumper assembly which provides electrical and hydraulic couplings in a concentrated location easily accessible by an operator and in close proximity to the electrically and hydraulically operated equipment in its use position.

We claim:

1. A bumper apparatus for a wheeled vehicle carrying a cable pulling system including a winch assembly, said bumper apparatus comprising: a frame fixedly secured to the vehicle, extensible support means carried by said frame and movable with respect thereto between a retracted stowed position and an extended use position projecting away from the vehicle, and mounting means carried by said support means and adapted for supporting engagement with the associated winch assembly in a use configuration.

2. The bumper apparatus of claim 1, wherein said support means includes an outer tubular member fixedly secured to said frame and an inner member telescopically movable within said outer member between said retracted and extended positions.

3. The bumper apparatus of claim 2, wherein said support means moves between the retracted and extended positions thereof in directions laterally of the vehicle.

4. The bumper apparatus of claim 1, wherein said mounting means includes a vertically oriented support tube.

5. The bumper apparatus of claim 4, wherein said support tube is substantially square in transverse cross section.

6. The bumper apparatus of claim 1, wherein said apparatus includes two of said support means respectively disposed on opposite sides of the vehicle.

7. The bumper apparatus of claim 1, wherein said apparatus is mounted at the rear of the vehicle.

8. A bumper apparatus for a wheeled vehicle carrying a cable pulling system including a winch assembly, said bumper apparatus comprising: a frame fixedly secured to the vehicle, extensible support means carried by said frame and movable with respect thereto between a retracted stowed position and an extended use position projecting away from the vehicle, mounting means carried by said support means and adapted for supporting engagement with the associated winch assembly in a use configuration, and jacking means carried by said support means and extensible therefrom for engagement with the ground for supporting the vehicle independently of its wheels.

9. The bumper apparatus of claim 8, wherein said jacking means includes a manually-operated screw-type jack.

10. The bumper apparatus of claim 8, wherein said jacking means is mounted for pivotal movement between a horizontal storage condition and a vertical use condition.

11. The bumper apparatus of claim 8, wherein said apparatus includes two of said jacking means respectively disposed on opposite sides of the vehicle.

12. The bumper apparatus of claim 11, wherein said support means includes a pair of support assemblies respectively disposed on opposite sides of the vehicle and respectively carrying said two jacking means.

13. The bumper apparatus of claim 8, wherein said support means includes an outer tubular member fixedly secured to said frame and an inner member telescopically movable within said outer member between said retracted and extended positions.

14. A bumper apparatus for a wheeled vehicle having a chassis carrying an electrical system and a hydraulic system and a cable pulling system including a winch assembly, said bumper apparatus comprising: a frame fixedly secured to the vehicle chassis, an extensible support arm carried by said frame and movable with respect thereto between a retracted stowed position and an extended use position projecting away from the vehicle, a support bracket carried by said arm and adapted for supporting engagement with the associated winch assembly in a use configuration, quick connect/disconnect coupling means carried by said frame and connected to the hydraulic system for affording coupling of the winch assembly thereto, and electrical outlet means carried by said frame and connected to the electrical system for affording connection of the cable pulling system thereto.

15. The bumper apparatus of claim 14, wherein said coupling means includes two pairs of couplers.

16. The bumper apparatus of claim 14, wherein said electrical outlet means includes four electrical sockets.

17. The bumper apparatus of claim 14, wherein said support means includes an outer tubular member fixedly secured to said frame and an inner member telescopically movable within said outer member between said retracted and extended positions.

18. The bumper apparatus of claim 14, wherein said apparatus includes a pair of said support arms respectively disposed on opposite sides of the vehicle.

19. The bumper apparatus of claim 18, and further comprising two jacking assemblies respectively carried by said support arms and extensible therefrom for engagement with the ground for supporting the vehicle independently of its wheels.

20. The bumper apparatus of claim 19, wherein each of said jacking means is pivotally movable with respect to the associated support arm between a horizontal storage condition and a vertical use condition.

* * * * *